(12) United States Patent
Wang et al.

(10) Patent No.: US 12,359,047 B2
(45) Date of Patent: Jul. 15, 2025

(54) LOW STRESS WHITENING POLYPROPYLENE COMPOSITION

(71) Applicant: Borealis AG, Vienna (AT)

(72) Inventors: Jingbo Wang, Linz (AT); Markus Gahleitner, Linz (AT); Friedrich Berger, Linz (AT)

(73) Assignee: BOREALIS AG, Vienna (AT)

( * ) Notice: Subject to any disclaimer, the term of this patent is extended or adjusted under 35 U.S.C. 154(b) by 803 days.

(21) Appl. No.: 17/603,166

(22) PCT Filed: Mar. 27, 2020

(86) PCT No.: PCT/EP2020/058733
§ 371 (c)(1),
(2) Date: Oct. 12, 2021

(87) PCT Pub. No.: WO2020/207825
PCT Pub. Date: Oct. 15, 2020

(65) Prior Publication Data
US 2022/0195166 A1 Jun. 23, 2022

(30) Foreign Application Priority Data
Apr. 12, 2019 (EP) .................................. 19169033

(51) Int. Cl.
*C08L 23/16* (2006.01)
*C08F 2/00* (2006.01)
(Continued)

(52) U.S. Cl.
CPC .............. *C08L 23/16* (2013.01); *C08F 2/001* (2013.01); *C08J 5/18* (2013.01); *C08L 23/12* (2013.01);
(Continued)

(58) Field of Classification Search
None
See application file for complete search history.

(56) References Cited

U.S. PATENT DOCUMENTS

2010/0022715 A1* 1/2010 Grein ................. C08L 23/0853
525/240
2015/0259454 A1* 9/2015 Gahleitner ............ C08F 210/06
526/348
(Continued)

FOREIGN PATENT DOCUMENTS

EP 3450472 A1 3/2019
WO WO 2015/150467 A1 10/2015
(Continued)

OTHER PUBLICATIONS

International Search Report for PCT Application No. PCT/EP2020/058733 dated Jun. 16, 2020.

*Primary Examiner* — Anthony J Frost
(74) *Attorney, Agent, or Firm* — Lippes Mathias LLP

(57) ABSTRACT

The present invention relates to a heterophasic polyolefin composition and articles produced therefrom with improved mechanical and optical properties, particularly low stress whitening. The present invention further relates to a process for the preparation of such a heterophasic polyolefin composition, articles made therefrom, particularly films, and uses of the heterophasic polyolefin composition. The heterophasic propylene copolymer composition comprises a heterophasic propylene copolymer (HECO) comprising a matrix (M) being a propylene homopolymer (H-PP) and an elastomeric propylene copolymer (EPC) dispersed in said matrix (M), wherein the heterophasic propylene copolymer (HECO) has (a) a melt flow rate MFf¾ (2.16 kg, 230° C.) measured according to ISO 1133 in the range of 5.0 to 25.0 g/10 min, (b) a soluble fraction content (SF) determined by TREF fractionation on CRYSTEX QC, Polymer Char (Va-
(Continued)

lencia, Spain) in the range of 10.0 to 25.0 wt. %, (c) an ethylene content of the soluble fraction content (SF) in the range of from 18 wt. % to less than 39 wt. %, (d) an intrinsic viscosity (IV) determined according to DIN ISO 1628/1 (in decalin at 135° C.) of the soluble fraction (SF) in the range of from 1.5 to 2.5 dl/g, (e) a crystalline fraction content (CF) determined by TREF fractionation on CRYSTEX QC, Polymer Char (Valencia, Spain) in the range of 75 to 90 wt. %, (f) an ethylene content of the crystalline fraction content (CF) of from 0.1 wt. % to 5.0 wt. %, and the heterophasic propylene copolymer composition has a total ethylene content in the range of from 7 to 30 wt. %, determined by quantitative NMR spectroscopy.

13 Claims, 2 Drawing Sheets

(51) Int. Cl.
*C08J 5/18* (2006.01)
*C08L 23/12* (2006.01)

(52) U.S. Cl.
CPC ..... *C08L 2203/16* (2013.01); *C08L 2205/025* (2013.01); *C08L 2205/035* (2013.01); *C08L 2205/22* (2013.01); *C08L 2207/02* (2013.01); *C08L 2207/062* (2013.01); *C08L 2314/02* (2013.01)

(56) References Cited

U.S. PATENT DOCUMENTS

2016/0257809 A1* 9/2016 Biondini ................ C08K 3/016
2017/0240734 A1* 8/2017 Wang ....................... C08L 23/12
2020/0165425 A1* 5/2020 Gahleitner .......... C08F 4/65927

FOREIGN PATENT DOCUMENTS

WO    WO 2018/185024 A1    10/2018
WO    WO-2019042875 A1 *  3/2019  .............. C08F 2/001

* cited by examiner

LOW STRESS WHITENING POLYPROPYLENE COMPOSITION

CROSS REFERENCE TO RELATED APPLICATIONS

This application is a 371 of PCT Application No. PCT/EP2020/058733, filed Mar. 27, 2020, which claims the benefit of European Application No. 19169033.8, filed Apr. 12, 2019, the contents of which are incorporated herein in their entirety.

BACKGROUND OF THE INVENTION

The present invention relates to a heterophasic polyolefin composition with improved mechanical and optical properties. The present invention further relates to a process for the preparation of such a heterophasic polyolefin composition, articles made therefrom, particularly films, and uses of the heterophasic polyolefin composition.

Polymers, like polypropylene, are increasingly used in different demanding applications. At the same time there is a continuous search for tailored polymers which meet the requirements of these applications. The demands can be challenging, since many polymer properties are directly or indirectly interrelated, i.e. improving a specific property can only be accomplished on the expense of another property.

For example, polypropylene films are quite often used in the packaging industry for consumer related articles with good "see-through" properties on the content of the packed goods. There is an also increasing trend in the medical packaging industry to use such polypropylene films.

Nowadays, due to the higher life standards and more strict requirements, specific properties like high flow (energy saving and long flow length for thinner wall) and a good combination of softness, toughness and transparency, in the sense of low haze, become continuously more important.

It is further important, that the polymers provide good optical properties in the sense of low haze and good transparency despite having undergone mechanical deformation, i.e. there is a strong requirement for polypropylene having a low tendency to stress whitening. Such stress whitening marks are highly disturbing the optical performance and impression of injection moulded final articles and should therefore be avoided.

It is known that heterophasic propylene copolymers (HECOs) are a generally suitable class of soft base polymers applicable for cast and blown film applications. Such heterophasic propylene copolymers comprise a matrix being either a propylene homopolymer or a random propylene copolymer in which an amorphous phase, which contains a propylene copolymer rubber (elastomer), is dispersed. Thus the polypropylene matrix contains (finely) dispersed inclusions not being part of the matrix and said inclusions contain the elastomer. The term inclusion indicates that the matrix and the inclusion form different phases within the heterophasic propylene copolymer, said inclusions are for instance visible by high resolution microscopy, like electron microscopy or scanning force microscopy or atomic force microscopy, or by dynamic mechanical thermal analysis (DMTA). Further the heterophasic polypropylene may contain to some extent a crystalline polyethylene, which is a by-reaction product obtained by the preparation of the heterophasic propylene copolymer. Such crystalline polyethylene is present as inclusion of the amorphous phase due to thermodynamic reasons.

The rubber phase in such heterophasic systems normally scatters the light, which makes the resulting films produced from these systems white. This is due to the fact that the rubber phase has different refractive index than the surrounding matrix and/or forms relatively big spheres. Unfortunately there are very limited ways to tune the optical properties for film compositions.

Generally, for achieving high transparency/low haze in two-phasic systems it is necessary to design a system where no scattering of light occurs at the phase boundaries.

The person skilled however is further well aware, that such heterophasic systems with stiff matrix and elastomeric resin dispersed therein are very sensitive to stress whitening or blushing. This is especially true for heterophasic systems having high rubber content.

Stress whitening results from internal cavitation on the particle/matrix interface or inside the rubber particles of the polymer. As said cavitation is related to energy dissipation in the failure process stress whitening can hardly be avoided when designing materials combining a high level of toughness with high stiffness. While in case of failure, cracks are stopped and energy is dissipated at internal surfaces, this dissipation goes along with craze formation becoming visible in the deformation zone.

One way to improve the optical properties is to reduce the molecular weight of rubber phase, but this may introduce further problems, namely a reduction of the toughening effect and possible problems during production and conversion due to stickiness of the polymer powder.

Stress whitening on the other side can be compensated by either using rubber phases of higher crystallinity or by addition of a high density polyethylene (HDPE) component (H. J. Jang et al., Macromol. Symp. 2012, 312, 34-42). Both approaches are, however, also known to reduce transparency or increase haze respectively.

WO 2006/067023 A1 discloses a polypropylene composition comprising (a) 50-77 wt. % of a crystalline propylene polymer having an amount of isotactic pentads (mmmm), measured by $^{13}$C-NMR on the XCI fraction, higher than 97.5 mol % and a polydispersity index ranging from 4 to 10; (b) 13-28 wt % of an elastomeric copolymer of ethylene and propylene having an ethylene content from 30 to 70 wt % and exhibiting an XCI fraction of less than 45 wt %, the XCS fraction having an intrinsic viscosity value ranging from 2 to 4 dl/g; and (c) 10-22 wt % of an ethylene homopolymer or ethylene-propylene copolymer having a comonomer content lower than 10 wt % and an intrinsic viscosity value ranging from 1 to 3 dl/g; in said composition component (b) plus component (c) being in an amount of at least 25 wt %. However the addition of the component (c) affects transparency and haze, as discussed above.

EP 1 702 956 A1 is another approach to provide a heterophasic polypropylene composition with good mechanical and optical properties. It discloses a composition comprising (a) 85-98 wt. %, based on the total weight of the composition of a heterophasic propylene/α-olefin copolymer comprising a polymer or copolymer of propylene and an α-olefin with 0-15 mol % of the α-olefin as matrix polymer and a propylene/α-olefin rubber copolymer comprising 20-80 mol % of the α-olefin and (b) 15-2 wt. %, based on the total weight of the composition of an ethylene homopolymer, the ethylene homopolymer having a density lower than 0.920 g/cm$^3$ according to ISO1183. However, the composition is not suitable in applications where stress whitening reduction is required. Its mechanical properties are also insufficient due to its long chain branching structure.

Thus, there is still a need for heterophasic polypropylene compositions, which show improved mechanical and optical properties, especially improved stress whitening performance.

Hence, it is an object of the present invention to provide such a heterophasic polypropylene composition, a process for its production, improved articles and uses involving such a heterophasic polypropylene composition.

SUMMARY OF THE INVENTION

The present invention is based on the finding that the above objects can be achieved by a heterophasic polyolefin composition comprising specific matrix and rubber design.

Thus, the present invention concerns a polypropylene composition and articles produced thereof which fulfil low stress whitening requirements.

The present invention also deals with a polymerization method, suitable for the production of such a heterophasic polypropylene composition.

The present invention is based on the finding that the above mentioned objects can be achieved by a particular heterophasic propylene copolymer composition, comprising
a heterophasic propylene copolymer (HECO) comprising
a matrix (M) being a propylene homopolymer (H-PP) and an elastomeric propylene copolymer (EPC) dispersed in said matrix (M),
wherein the heterophasic propylene copolymer (HECO) has
a) a melt flow rate $MFR_2$ (2.16 kg, 230° C.) measured according to ISO 1133 in the range of 5.0 to 25.0 g/10 min,
(b) a soluble fraction content (SF) determined by TREF fractionation on CRYSTEX QC, Polymer Char (Valencia, Spain) as described herein, in the range of 10.0 to 25.0 wt. %,
(c) an ethylene content of the soluble fraction content (SF) determined under (b) in the range of from 18 wt. % to less than 39 wt. %,
(d) an intrinsic viscosity (IV) determined according to DIN ISO 1628/1 (in decalin at 135° C.) of the soluble fraction (SF) in the range of from 1.5 to 2.5 dl/g,
(e) a crystalline fraction content (CF) determined by TREF fractionation on CRYSTEX QC, Polymer Char (Valencia, Spain) as described herein, in the range of 75 to 90 wt. %,
(f) an ethylene content of the crystalline fraction content (CF) determined under (e) of from 0.1 wt. % to 5.0 wt. %, and
the heterophasic propylene copolymer composition has a total ethylene content in the range of from 7 wt. % to 30 wt. %, determined by quantitative NMR spectroscopy as described in the method section below.

The heterophasic propylene copolymer composition preferably further comprises an ethylene copolymer (EC), and/or an alpha-nucleating agent (NU), preferably a polymeric alpha-nucleating agent.

The ethylene copolymer (EC) may preferably be contained in the heterophasic propylene copolymer composition in an amount of from 3 to 20 wt. %, more preferably from 5 to 18 wt. %, even more preferably from 6 to 15 wt. %, still more preferably from 7 to 10 wt. %. The heterophasic propylene copolymer (HECO) may preferably have a hexane soluble content, determined in accordance with FDA section 177.1520 of 0.1 to lower than 2.0 wt. %, more preferably 0.3 to 1.9 wt. %, even more preferably 0.5 to 1.8 wt % or 0.8 to 1.6 wt %.

It has surprisingly been found out that such a heterophasic propylene copolymer composition has not only improved mechanical properties but also improved optical properties, especially an improved stress whitening performance. The inventive heterophasic propylene copolymer compositions are applicable for the preparation of films for packaging of consumer goods, as well as for medical packaging.

The present invention further relates to a process for the production of the above heterophasic propylene copolymer composition, comprising polymerizing propylene in at least two subsequent polymerization steps in the presence of a Ziegler-Natta catalyst (ZN-C), as described in more detail below.

In one further embodiment of the present invention, the heterophasic propylene copolymer composition preferably has a stress whitening intensity, determined as described in more detail below, of not more than 3.5, more preferably 0.3 to 3.1, even more preferably from 0.5 to 2.5. The stress whitening intensity may even be 0.0 which can be combined with any upper limit. The stress whitening intensity is determined as described in the method section below.

DETAILED DESCRIPTION OF THE INVENTION

Figure 1:
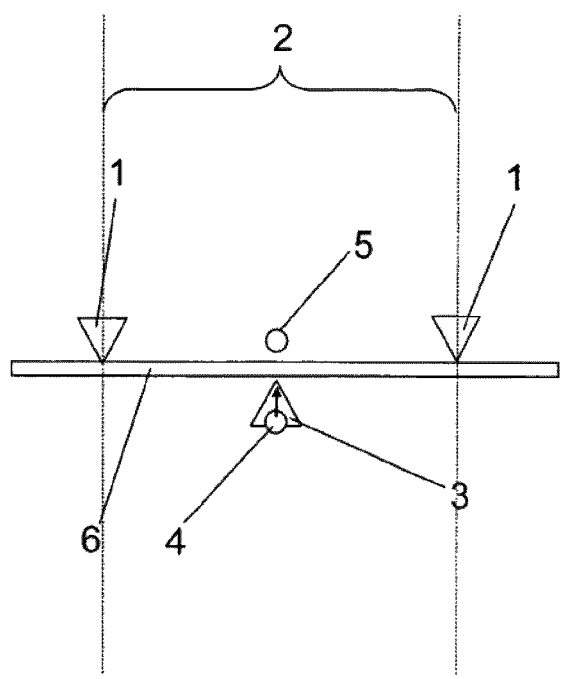
FIG. 1 illustrates a schematic representation of the experimental set up for stress whitening measurement.

In the following the individual components of the inventive heterophasic propylene copolymer composition are defined in more detail.

The particular heterophasic polypropylene composition of the present invention comprises at least a heterophasic propylene copolymer (HECO) comprising
a matrix (M) being a propylene homopolymer (H-PP) and an elastomeric propylene copolymer (EPC) dispersed in said matrix (M), as defined in more detail below.

Optionally the heterophasic polypropylene composition further comprises a component (c) being an ethylene copolymer (EC), and/or a component (d) being a nucleating agent, preferably an alpha-nucleating agent. In a more preferred embodiment, the component (d) is a polymeric alpha-nucleating agent.

The term "heterophasic propylene copolymer composition" used herein denotes compositions comprising a heterophasic propylene copolymer (HECO) as specified in detail below containing a matrix resin (M), being a propylene homopolymer (H-PP) and an elastomeric propylene copolymer (EPC) dispersed in said matrix resin (M) and said composition optionally further comprising an ethylene copolymer (EC) and/or an alpha-nucleating agent.

In the present invention, the term "matrix" is to be interpreted in its commonly accepted meaning, i.e. it refers to a continuous phase (in the present invention a continuous polymer phase) in which isolated or discrete particles such as rubber particles may be dispersed. The propylene homopolymer, preferably crystalline propylene homopolymer is present in such an amount that it forms a continuous phase which can act as a matrix. In the present invention polypropylene content and ethylene content of the matrix phase is measured by the crystalline fraction (CF) determined by TREF fractionation on CRYSTEX QC, Polymer Char (Valencia, Spain) as described in the method section below.

Furthermore the terms "elastomeric propylene copolymer (EPC)", "dispersed phase" and "ethylene-propylene rubber" denote the same, i.e. are interchangeable. In the present invention polymer content and ethylene content of the disperse phase is measured by the soluble fraction (SF) determined by TREF fractionation on CRYSTEX QC, Polymer Char (Valencia, Spain) as described in the method section below.

A propylene homopolymer (H-PP), which may be a crystalline, more preferably crystalline isotactic propylene homopolymer forms the matrix of the heterophasic propylene copolymer (HECO).

The expression "homopolymer" used in the present invention relates to a polypropylene that consists substantially, i.e. of at least 97.0 wt %, preferably of at least 98.0 wt %, more preferably of at least 99.0 wt %, still more preferably of at least 99.8 wt % of propylene units. In a preferred embodiment only propylene units in the propylene homopolymer are detectable.

The propylene homopolymer matrix may preferably be isotactic having a high pentad concentration, i.e. higher than 96.0 mol %, like a pentad concentration of at least 96.3 mol %. The pentad concentration is preferably 96.5 mol % up to 99.9% and more preferably 96.7 mol % to 99.8%.

The propylene homopolymer matrix preferably has a melt flow rate MFR$_2$ (ISO 1133; 230° C.; 2.16 kg) in the range of 0.1-50 g/10 min, more preferably in the range of 1.0-40 g/10 min and even more preferably in the range of 2.0-30 g/10 min.

The propylene homopolymer matrix can be unimodal or multimodal, e.g. bimodal.

When the propylene homopolymer matrix phase is unimodal with respect to the molecular weight distribution, it may be prepared in a single stage process e.g. a slurry or gas phase process in a slurry or gas phase reactor. Preferably, a unimodal matrix phase is polymerized as a slurry polymerization. Alternatively, the unimodal matrix may be produced in a multistage process using at each stage process conditions which result in similar polymer properties.

Where the propylene homopolymer matrix comprises two or more different propylene polymers, like propylene homopolymer fractions (H-PP-1) and (H-PP-2) these may be polymers with different monomer make up and/or with different molecular weight distributions. These components may have identical or differing monomer compositions and tacticities.

Thus in one embodiment or the present invention the matrix (M) is unimodal, whereas in another embodiment the matrix (M) is bimodal and consists of two propylene homopolymer fractions (H-PP-1) and (H-PP-2).

(a) Elastomeric Propylene Copolymer (EPC)

An elastomeric propylene copolymer (EPC), which is a copolymer of propylene and an alpha-olefin comonomer is dispersed in said matrix (M) (i.e. dispersed phase). The alpha-olefin comonomer is preferably ethylene.

Preferably, the elastomeric propylene copolymer (EPC) of the heterophasic propylene copolymer (HECO) is a predominantly amorphous propylene copolymer.

The elastomeric propylene copolymer (EPC) is characterized by its soluble fraction content (SF) determined by TREF fractionation on CRYSTEX QC, Polymer Char (Valencia, Spain) as described in the method section below. The amount of the soluble fraction (SF) in the heterophasic propylene copolymer (HECO) may be in the range of 10.0 to 25.0 wt. %, preferably 12.0 to 23.0 wt. %, more preferably 14.0 to 20.0 wt. %.

The soluble fraction (SF) is preferably composed of propylene and ethylene monomer units, wherein the ethylene content of the soluble fraction content (SF) may be in the range of from 18 wt. % to less than 39 wt. %, preferably in the range of 20.0-38.0 wt.-%, more preferably in the range of 22.0-37.0 wt.-%, such as 24.0-36.5 wt.-%.

The intrinsic viscosity (IV) of the soluble fraction (SF), determined according to DIN ISO 1628/1 (in decalin at 135° C.), is in the range of from 1.5 to 2.5 dl/g, preferably in the range of from 1.6 to 2.4 dl/g, more preferably in the range of from 1.7 to 2.3 dl/g.

The dispersed phase can be unimodal or multimodal, like bimodal.

In one embodiment, the dispersed phase is unimodal. More particularly, the dispersed phase is preferably unimodal in view of the intrinsic viscosity and/or the comonomer distribution.

Preferably the unimodal dispersed phase is made in one reaction stage, more preferably in a gas phase reactor and comprises, respectively consists of one propylene copolymer fraction (EPC).

The elastomeric propylene copolymer (EPC) can either be synthesized in the later step(s) of a multistage process, after the propylene homopolymer (H-PP) has been synthesized. Alternatively, the elastomeric propylene copolymer (EPC) can be polymerised separately and mixed with the propylene homopolymer (H-PP) in a separate melt blending step. It is preferred, that the incorporation of the EPC into the H-PP is done during a multistage polymerisation process.

(b) Heterophasic Propylene Copolymer (HECO)

The heterophasic propylene copolymer composition of the present invention may contain the heterophasic propylene copolymer (HECO) as a major but also as the only resin component.

The heterophasic propylene copolymer (HECO) has an ethylene content, determined from the soluble fraction (SF) obtained by TREF fractionation on CRYSTEX QC, Polymer Char (Valencia, Spain), as described in the method section below, in the range of from 18 to less than 39 wt. %, preferably in the range of 20.0-38.0 wt.-%, more preferably in the range of 22.0-37.0 wt.-%, such as 24.0-36.5 wt.-%.

The heterophasic propylene copolymer (HECO) has an soluble fraction content (SF), determined by TREF fractionation on CRYSTEX QC, Polymer Char (Valencia, Spain), as described in the method section below, in the range of from 10.0 to 25.0 wt. %, preferably 12.0 to 23.0 wt. %, more preferably 14.0 to 20.0 wt. %.

The intrinsic viscosity (IV) measured according to ISO 1628-1 (at 135° C. in decalin) of the soluble fraction (SF) is in the range of from 1.5 to 2.5 dl/g, preferably in the range of 1.6 to 2.4 dl/g, more preferably in the range of 1.7 to 2.3 dl/g. A low intrinsic viscosity (IV) value reflects a low average molecular weight.

The heterophasic propylene copolymer (HECO) has a crystalline fraction content (CF), determined by TREF fractionation on CRYSTEX QC, Polymer Char (Valencia, Spain), as described in the method section below, in the range of from 75 to 90 wt. %, preferably in the range of from 77 to 88 wt. %, more preferably in the range of from 80 to 86 wt. %. The crystalline fraction content (CF) is mainly determined by the presence of the propylene homopolymer matrix.

The heterophasic propylene copolymer (HECO) has an ethylene content, determined from the crystalline fraction (CF) obtained by TREF fractionation on CRYSTEX QC, Polymer Char (Valencia, Spain), as described in the method section below, in the range of from 0.1 to 5.0 wt. %, preferably in the range of from 1.0 to 5.0 wt. % and more preferably in the range of from 3.0 to 5.0 wt. %. Any lower limit may be combined with any upper limit. In preferred embodiments, the intrinsic viscosity (IV) measured according to ISO 1628-1 (at 135° C. in decalin) of the crystalline fraction (CF) may be in the range of from 1.0 to 3.0 dl/g, preferably in the range of 1.2 to 2.0 dl/g. Any lower limit may be combined with any upper limit in the above ranges.

It is further preferred that the heterophasic propylene copolymer (HECO) has a limited amount of hexane soluble content, determined in accordance with FDA section 177.1520 ($C6_{FDA}$). This is especially advantageous for food applications which should comply with strict government regulations. Thus, the amount of hexane soluble content ($C6_{FDA}$) is preferably lower than 2.0 wt. %, more preferably not more than 1.8 wt. %, even more preferably not more than 1.6 wt. %.

(c) Ethylene Copolymer (EC)

The heterophasic polypropylene composition of the present invention may further comprise an optionally crystalline ethylene copolymer (EC) with an α-olefin comonomer with 3-10 carbon atoms, preferably 4-8 carbon atoms, more preferably 4 to 6 carbon atoms, like 4 or 6 carbon atoms.

Alpha-olefins with 3-10 carbon atoms are for example propylene, 1-butene, 1-pentene, 1-hexene, 1-heptene and 1-octene.

The ethylene copolymer (EC) may also be added/compounded as external component to the heterophasic propylene copolymer (HECO) In these cases, the EC may have a density of from 940 to 975 kg/m$^3$, preferably from 950 to 970 kg/m$^3$, more preferably from 955 to 968 kg/m$^3$ The ethylene copolymer (EC) may have a melt flow rate $MFR_2$ (ISO 1133; 230° C.; 2.16 kg) in the range of from 1.0 to 20 g/10 min, preferably from 3.0 to 15.0 g/10 min, more preferably from 5.0 to 13.0 g/10 min.

The EC may be a unimodal or multimodal, e.g. bimodal polymer.

The ethylene copolymer (EC) may preferably be contained in the heterophasic propylene copolymer composition of the present invention in an amount of from 3 to 20 wt. %, more preferably in the range of from 5 to 18 wt. %, even more preferably in the range of from 6 to 16 wt. %.

The crystalline ethylene copolymer has a melting temperature Tm2 as determined by DSC analysis according to ISO 11357.

Preferably, Tm2 of the crystalline ethylene copolymer is within the range of 105° C. to 130° C., more preferably within the range of 110° C. to 127° C. and most preferably within the range of 112° C. to 124° C.

(d) Alpha-Nucleating Agent (NA)

The heterophasic polypropylene composition of the present invention may further comprise an alpha-nucleating agent (NA) for promoting the α-phase of polypropylene. Preferably the alpha-nucleating agent is a polymeric alpha-nucleating agent, more preferably a vinylcycloalkane polymer and/or a vinylalkane polymer.

Said polymeric alpha-nucleating agent may be introduced into the composition by blending with a masterbatch (MB) together with e.g. a carrier polymer or during polymerization of the heterophasic propylene copolymer (HECO), preferably, the polymeric alpha-nucleating agent is introduced into the composition by pre-polymerizing the catalyst used to prepare a part or all of the heterophasic propylene copolymer (HECO).

Any known polymeric alpha-nucleating agent may be employed including polymers of vinyl alkanes and vinyl cycloalkanes.

A preferred example of such a polymeric alpha-nucleating agent is a vinyl polymer, such as a vinyl polymer derived from monomers of the formula

wherein R$^1$ and R$^2$, together with the carbon atom they are attached to, form an optionally substituted saturated or unsaturated or aromatic ring or a fused ring system, wherein the ring or fused ring moiety contains four to 20 carbon atoms, preferably 5 to 12-membered saturated or unsaturated or aromatic ring or a fused ring system or independently represent a linear or branched C$_4$-C$_{30}$ alkane, C$_4$-C$_{20}$ cycloalkane or C$_4$-C$_{20}$ aromatic ring. Preferably R$^1$ and R$^2$, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric alpha-nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

Polymeric nucleating agents can either be incorporated by in-reactor nucleation (also called BNT technology) or by the so called masterbatch technology (compounding technology). In a preferred embodiment of the present invention, the polymeric alpha-nucleating agent is introduced into the propylene copolymer by means of a suitably modified catalyst, into the reactor (i.e. in-reactor nucleation) i.e. the catalyst to be used in catalyzing the polymerisation of any of the polypropylene homopolymer (H-PP) or the ethylene-propylene rubber (EPC), is subjected to a polymerisation of a suitable monomer for the polymeric alpha-nucleating agent to produce first said polymeric alpha-nucleating agent. The catalyst is then introduced together with the obtained polymeric alpha-nucleating agent to the actual polymerisation step of the heterophasic polypropylene composition. In a particularly preferred embodiment of the present invention, the heterophasic propylene copolymer (HECO) is prepared in the presence of such a modified catalyst.

Another embodiment, different to the above mentioned in-reactor blend, is a mechanical blend of a polymer with an alpha-nucleating agent, wherein the polymer is first produced in the absence of a polymeric alpha-nucleating agent and is then blended mechanically with the polymeric alpha-nucleating agent or with a small amount of nucleated polymer or with polymers, which already contain the polymeric alpha-nucleating agent (so-called master batch technology) in order to introduce the polymeric nucleating agent into the polymer mixture. The preparation of a reactor made polymer composition ensures the preparation of a homogenous mixture of the components, for example a homogenously distributed polymeric alpha-nucleating agent in the heterophasic polypropylene copolymer, even at high concentrations of polymer alpha-nucleating agent. As outlined above, the reactor made polymer composition is a preferred embodiment of the present invention, although also mechanical blends prepared, for example, by using master batch technology are envisaged by the present invention.

In case the alpha-nucleating agent is incorporated to the polypropylene composition in the form of a masterbatch (MB) said polymeric alpha-nucleating agent, most preferably a vinylcycloalkane, like vinylcyclohexane (VCH), polymer and/or vinylalkane polymer, preferably vinylcyclohexane (VCH), as defined above or below, is preferably present in an amount of not more than 500 ppm, more preferably of 1 to 200 ppm, and still more preferably of 5 to 100 ppm, based on the weight of the master batch (100 wt %). In this embodiment, more preferably, said masterbatch (MB) is present in an amount of not more than 10.0 wt %, more preferably not more than 5.0 wt % and most preferably not more than 3.5 wt %, with the preferred amount of masterbatch (MB) being from 1.5 to 3.5 wt %, based on the total amount of the heterophasic propylene copolymer (HECO). Most preferably, the masterbatch (MB) comprises, preferably consists of a homopolymer or copolymer, preferably homopolymer, of propylene which has been nucleated according to BNT-technology as described below.

It is preferred that the alpha-nucleating agent is introduced into the polypropylene composition during the polymerization process of the heterophasic propylene copolymer (HECO). The alpha-nucleating agent is preferably introduced into the heterophasic propylene copolymer (HECO) by first polymerizing the above defined vinyl compound, preferably vinylcycloalkane, in the presence of a catalyst system comprising a solid catalyst component, preferably a solid Ziegler Natta catalyst component comprising an internal donor (ID), a co-catalyst and optional external donor (ED), and the obtained reaction mixture of the polymer of the vinyl compound, and the catalyst system is then used for producing the heterophasic propylene copolymer (HECO). The above incorporation of the polymeric alpha-nucleating agent to the heterophasic propylene copolymer (HECO) during the polymerization of said heterophasic propylene copolymer (HECO) is called herein BNT-technology as described below.

Said obtained reaction mixture is herein below referred interchangeably as modified catalyst system.

Preferably the polymeric alpha-nucleating agent is vinylcyclohexane (VCH) polymer which is introduced into the heterophasic propylene copolymer (HECO) by the BNT technology.

More preferably in this preferred embodiment, the amount of polymeric alpha-nucleating agent, like vinylcyclohexane (VCH), polymer and/or vinylalkane polymer, more preferably of vinylcyclohexane (VCH) polymer, in the heterophasic propylene copolymer (HECO) is not more than 500 ppm, more preferably of 1 to 200 ppm, most preferably 5 to 100 ppm.

With regard to the BNT-technology reference is made to the international applications WO 99/24478 A1, WO 99/24479 A1 and particularly WO 00/68315 A1. According to this technology a catalyst system, preferably a Ziegler-Natta pro-catalyst, can be modified by polymerizing a vinyl compound in the presence of the catalyst system, comprising in particular the Ziegler-Natta procatalyst, an external donor and a co-catalyst, which vinyl compound has the formula: $CH_2=CH-CHR^1R^2$ as defined above.

The polymerized vinyl compound acts as an alpha-nucleating agent. The weight ratio of vinyl compound to solid catalyst component in the modification step of the catalyst is preferably of up to 5 (5:1), preferably up to 3 (3:1) most preferably from 0.5 (1:2) to 2 (2:1). The most preferred vinyl compound is vinylcyclohexane (VCH).

When an alpha-nucleating agent is introduced to the heterophasic propylene copolymer (HECO) during the polymerization process, the amount of alpha-nucleating agent present in the heterophasic propylene copolymer (HECO) is preferably not more than 500 ppm, more preferably is 0.025 to 200 ppm, still more preferably is 1 to 100 ppm, and most preferably is 5 to 100 ppm, based on the heterophasic propylene copolymer (HECO) and the alpha-nucleating agent, preferably based on the total weight of the heterophasic propylene copolymer (HECO) including all additives.

The use of the polymeric alpha-nucleating agent in accordance with the present invention enables the preparation of heterophasic propylene copolymer (HECO) having highly satisfactory mechanical properties, i.e. for improved stiffness/impact balance, so that it is not required for the compositions in accordance with the present invention to contain low molecular weight nucleating agents, in particular costly particulate nucleating agents like organo-phosphates or soluble nucleants like sorbitol- or nonitol-derived nucleating agents.

(f) Heterophasic Propylene Copolymer Composition

The heterophasic propylene copolymer composition of the present invention is further characterized by a total melt flow rate ($MFR_2$) (ISO 1133; 230° C.; 2.16 kg) in the range of 1.0-50 g/10 min, preferably in the range of 2.0-30 g/10 min, more preferably in the range of 5.0-25 g/10 min.

According to one embodiment the final melt flow rate of the heterophasic propylene copolymer composition is adjusted during the polymerization process. Accordingly the reactor-made heterophasic propylene copolymer (HECO) has the melt flow rate as defined above. "Reactor-made heterophasic propylene copolymer (HECO)" denotes herein that the melt flow rate of the heterophasic propylene copolymer (HECO) has not been modified on purpose by post-treatment. Thus it is preferred that the heterophasic propylene copolymer (HECO) does not contain any peroxide and/or decomposition product thereof.

The final melt flow rate of the heterophasic propylene copolymer composition may be modified by the introduction of additional components like the optional crystalline ethylene copolymer (EC) defined above. Thus, the melt flow rate of the heterophasic propylene copolymer (HECO) and the melt flow rate of the heterophasic propylene copolymer composition may differ.

It is also appreciated that the total content of the ethylene comonomers in the total heterophasic propylene copolymer composition is at least 7 wt. %, preferably at least 8 wt. %. The total ethylene comonomer content in the heterophasic propylene copolymer composition may be up to 30 wt. %, preferably up to 25 wt. %, even more preferably up to 20 wt. %. Any of the above lower ranges may be combined with any of the above upper ranges. The ethylene content is determined by quantitative NMR spectroscopy as described in the method section below.

The heterophasic propylene composition of the present invention may have improved optical properties, in particular advanced stress whitening properties. Thus, the heterophasic propylene composition may preferably have a stress whitening intensity, determined as described in the method section below, of not more than 3.5, more preferably of not more than 3.2, even more preferably not more than 3.1.

The heterophasic propylene copolymer composition of the present invention may have improved mechanical properties, in particular advanced stiffness properties. Thus, the heterophasic propylene composition may preferably have a flexural modulus of not less than 900 MPa, more preferably not less than 950 MPa, even more preferably not less than 1000 MPa, or 1100 MPa, determined in a 3-point-bending test according to ISO 178 as described in the method section below. The heterophasic propylene copolymer (HECO) may preferably have a flexural modulus of up to 1500 MPa, more preferably up to 1800 MPa, even more preferably up to 2000 MPa.

The heterophasic propylene composition of the present invention may preferably have a Charpy notched impact strength (NIS), determined according to ISO 179 1 eA at 23° C. of at least 6.0 kJ/m$^2$, more preferably of at least 7.0 kJ/m$^2$ The heterophasic propylene copolymer composition according to the present invention apart from the polymeric components and the alpha-nucleating agent, optionally in the form of a masterbatch (MB), may comprise further non-polymeric components, e.g. additives for different purposes.

The following are optional additives: process and heat stabilisers, pigments and other colouring agents allowing retaining transparency, antioxidants, antistatic agents, slip agents, antiblocking agent, UV stabilisers and acid scavengers.

Depending on the type of additive, these may be added in an amount of 0.001 to 2.0 wt %, based on the weight of the heterophasic propylene copolymer composition.

(g) Use of the Heterophasic Propylene Copolymer Composition

As used herein the term "molded article" is intended to encompass articles that are produced by any conventional molding technique, e.g. injection molding, stretch molding, compression molding, rotomolding or injection stretch blow molding. The term is not intended to encompass articles that are produced by casting or extrusion, such as extrusion blow molding. Thus, the term is not intended to include films or sheets. Articles produced by injection molding, stretch molding, or injection stretch blow molding are preferred. Articles produced by injection molding are especially preferred. The articles preferably are thin-walled articles having a wall thickness of 300 µm to 2 mm. More preferably, the thin-walled articles have a wall thickness of 300 µm to 1400 µm, and even more preferably the thin-walled articles have a wall thickness of 300 µm to 900 µm. The articles of the current invention can be containers, such as cups, buckets, beakers, trays or parts of such articles, such as see-through-windows, lids, or the like. The articles of the current invention are especially suitable for containing food, especially frozen food, such as ice-cream, frozen liquids, sauces, pre-cooked convenience products, and the like. Articles of the current invention are also suitable for medical or diagnostic purposes, such as syringes, beaker, pipettes, etc.

(h) Polymerization Process

The heterophasic propylene copolymer composition in accordance with the present invention may be prepared by any suitable process, including in particular blending processes such as mechanical blending including mixing and melt blending processes and any combinations thereof as well as in-situ blending during the polymerization process. These can be carried out by methods known to the skilled person, including batch processes and continuous processes.

The heterophasic propylene copolymer composition according to the invention is preferably prepared by a sequential polymerization process, as described below, in the presence of a catalyst system comprising a Ziegler-Natta catalyst (ZN-C) comprising an internal donor (ID), a co-catalyst (Co) and optionally an external donor (ED), as described below.

The term "sequential polymerization system" according to this invention indicates that the heterophasic propylene copolymer composition is produced in at least two polymerization reactors connected in series. Accordingly, the present polymerization system comprises at least a first polymerization reactor (R1), a second polymerization reactor (R2), optionally a third polymerization reactor (R3), and further optionally a fourth polymerization reactor (R4). The term "polymerization reactor" shall indicate that the main polymerization takes place.

Preferably, at least one of the two polymerization reactors (R1) and (R2) is a gas phase reactor (GPR). More preferably the second polymerization reactor (R2), the optional third polymerization reactor (R3) and the optional fourth polymerization reactor (R4) are gas phase reactors (GPRs), i.e. a first gas phase reactor (GPR1) and a second gas phase reactor (GPR2) and a third gas phase reactor (GPR3). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

In this first polymerization reactor (R1) the matrix polypropylene (H-PP) or part of it, i.e. a first propylene homopolymer fraction (H-PP-1), is produced.

Preferably this propylene homopolymer of the first polymerization reactor (R1), more preferably the polymer slurry of the loop reactor (LR) containing the matrix (M) or part of it, i.e. a first propylene homopolymer fraction (H-PP-1), is directly fed into the second polymerization reactor (R2), i.e. into the (first) gas phase reactor (GPR1), without a flash step between the stages.

This kind of direct feed is described in EP 887379 A, EP 887380 A, EP 887381 A and EP 991684 A.

By "direct feed" is meant a process wherein the content of the first polymerization reactor (R1), i.e. of the loop reactor (LR), the polymer slurry comprising the propylene homopolymer matrix (H-PP) or part of it, i.e. a first propylene homopolymer fraction (H-PP-1), is led directly to the next stage gas phase reactor.

Alternatively, the propylene homopolymer of the first polymerization reactor (R1), preferably polymer slurry of the loop reactor (LR) containing the propylene homopolymer matrix, may be also directed into a flash step or through a further concentration step before fed into the second polymerization reactor (R2), i.e. into the 1$^{st}$ gas phase reactor (GPR1). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2) and any subsequent reactor, for instance, the third (R3) or fourth polymerization reactor (R4) are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus, in a preferred embodiment the first polymerization reactor (R1) is a slurry reactor (SR), like loop reactor (LR), whereas the second polymerization reactor (R2) and the optional third polymerization reactor (R3), and the optional fourth polymerization reactor (R4) are gas phase reactors (GPRs).

Accordingly for the present process at least two, preferably two polymerization reactors (R1), and (R2) or three polymerization reactors (R1), (R2) and (R3), or even four polymerization reactors (R1), (R2), (R3) and (R4), namely a slurry reactor (SR), like loop reactor (LR) and a (first) gas phase reactor (GPR1), an optional second gas phase reactor (GPR2), and optionally a third gas phase reactor (GPR3) connected in series are used.

Prior to the slurry reactor (SR) a pre-polymerization reactor may be placed.

As the process covers also a pre-polymerization step, all of the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

Especially good results are achieved in case the temperature in the reactors is carefully chosen.

Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and in the optional third reactor (R3) and the optional the fourth reactor (R4) is in the range of 75 to 95° C., more preferably in the range of 78 to 92° C.

Preferably the operating temperature in the second polymerization reactor (R2) is equal to or higher than the operating temperature in the first polymerization reactor (R1). Accordingly it is preferred that the operating temperature in the first polymerization reactor (R1) is in the range of 62 to 85° C., more preferably in the range of 65 to 82° C., still more preferably in the range of 67 to 80° C., like 70 to 80° C.

It is further preferred that the operating temperature in the second polymerization reactor (R2) is in the range of 75 to 95° C., more preferably in the range of 78 to 92° C., still more preferably in the range of 78 to 88° C., with the proviso that the operating temperature in the in the second polymerization reactor (R2) is equal or higher to the operating temperature in the first polymerization reactor (R1).

Typically the pressure in the first polymerization reactor (R1), preferably in the loop reactor (LR), is in the range from 20 to 80 bar, preferably 30 to 70 bar, like 35 to 65 bar, whereas the pressure in the second polymerization reactor (R2), i.e. in the (first) gas phase reactor (GPR1), and in any subsequent reactor, like in the third polymerization reactor (R3), e.g. in the second gas phase reactor (GPR2), or in a fourth polymerization reactor (R4), e.g. in the third gas phase reactor (GPR3) is in the range from 5 to 50 bar, preferably 15 to 40 bar.

Preferably hydrogen is added in each polymerization reactor in order to control the molecular weight, i.e. the melt flow rate $MFR_2$.

In the pre-polymerization reactor (PR) a polypropylene (Pre-PP) is produced. The pre-polymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN-C), the co-catalyst (Co), and the external donor (ED) are only added in the pre-polymerization reactor (PR).

The pre-polymerization reaction is typically conducted at a temperature of 10 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed can be employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

A preferred multistage process is a "loop-gas phase"-process, as developed by Borealis (known as BORSTAR® technology) and is described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

In the process described above a Ziegler-Natta catalyst (ZN-C) for the preparation of the heterophasic polypropylene composition is applied. This Ziegler-Natta catalyst (ZN-C) can be any stereo-specific Ziegler-Natta catalyst (ZN-C) for propylene polymerization, which preferably is capable of catalysing the polymerization and copolymerization of propylene and comonomers at a pressure of 500 to 10000 kPa, in particular 2500 to 8000 kPa, and at a temperature of 40 to 110° C., in particular of 60 to 110° C.

Preferably, the Ziegler-Natta catalyst (ZN-C) comprises a high-yield Ziegler-Natta type catalyst including an internal donor component, which can be used at high polymerization temperatures of 80° C. or more.

Such high-yield Ziegler-Natta catalyst (ZN-C) comprises a non-phthalate donor as internal donor (ID). The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/ or mixtures thereof. Preferred examples are e.g. substituted maleates and citraconates, most preferably citraconates.

Accordingly, the internal donor preferably is free of phthalic acid esters as well as decomposition products thereof. "Free of phthalic acid esters as well as decomposition products thereof" indicates absence of such components within the well accepted understanding in the art. "Free of phthalic acid esters as well as decomposition products thereof" indicates a maximum of 10 μg/kg, i.e. 10 ppb by weight (H. Fromme, T. Küchler, T. Otto, K. Pilz, J. Müller, A. Wenzel Water Research 36 (2002) 1429-1438). Phthalates and decomposition products thereof may be detected by gas chromatography coupled with one- or two dimensional mass spectrometry (GC-MS respectively GC-MS/MS) optionally preceded by enrichment on a suitable adsorption material.

The Ziegler-Natta catalyst (ZN-C) is preferably used in association with an alkyl aluminum co-catalyst (Co) and optionally external donors (ED).

As further component in the present polymerization process an external donor (ED) is preferably present. Suitable external donors include certain silanes, ethers, esters, amines, ketones, heterocyclic compounds and blends of these. It is especially preferred to use a silane. It is most preferred to use silanes of the general formula

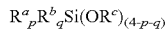

$$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$, or of general formula

$$Si(OCH_2CH_3)_3(NR^3R^4)$$

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert-butyl, tert-amyl, neopentyl, cyclopentyl, cyclohexyl, methylcyclopentyl and cycloheptyl.

More preferably, both $R^3$ and $R^4$ are the same, yet more preferably both $R^3$ and $R^4$ are an ethyl group.

Especially preferred external donors (ED) are the dicyclopentyl dimethoxy silane donor (D-donor) or the cyclohexylmethyl dimethoxy silane donor (C-Donor).

In addition to the Ziegler-Natta catalyst (ZN-C) and the optional external donor (ED), a co-catalyst (Co) can be used. The co-catalyst (Co) is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkyl-aluminum, like triethylaluminum (TEAL), dialkyl aluminum chloride or alkyl aluminum dichloride or mixtures thereof. In one specific embodiment the co-catalyst (Co) is triethylaluminum (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly, the mol-ratio of co-catalyst (Co) to external donor (ED) [Co/ED] must be in the range of 5 to 45, preferably is in the range of 5 to 35, more preferably is in the range of 5 to 25; and optionally (b) the mol-ratio of co-catalyst (Co) to titanium compound (TC) [Co/TC] must be in the range of above 80 to 500, preferably is in the range of 100 to 350, still more preferably is in the range of 120 to 300.

The heterophasic polypropylene composition (HECO) according to this invention is preferably produced in the presence of (a) a Ziegler-Natta catalyst (ZN-C) comprising an internal donor (ID),
(b) optionally a co-catalyst (Co), and
(c) optionally an external donor (ED).

As mentioned above the Ziegler-Natta catalyst (ZN-C) is optionally modified by the so called BNT-technology during the above described pre-polymerization step in order to introduce the polymeric nucleating agent.

A. Measuring Methods

The following definitions of terms and determination methods apply for the above general description of the invention including the claims as well as to the below examples unless otherwise defined.

(i) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR$_2$ of polypropylene is determined at a temperature of 230° C. and a load of 2.16 kg.

(ii) Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-d$_2$ (TCE-d$_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative $^{13}C\{^1H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio-defects:

$P_{total}=P_{12}+P_{21e}$

The mole percent of 2,1 erythro regio-defects was quantified with respect to all propene:

$[21e] \text{ mol }\%=100*(P_{21e}/P_{total})$ (iii) Crystalline and Soluble Fractions Method and Intrinsic Viscosity (IV)

The crystalline (CF) and soluble fractions (SF) of the polypropylene (PP) compositions as well as the comonomer content and intrinsic viscosities of the respective fractions were analysed by the CRYSTEX QC, Polymer Char (Valencia, Spain).

The crystalline and amorphous fractions are separated through temperature cycles of dissolution at 160° C., crystallization at 40° C. and re-dissolution in a 1,2,4-trichlorobenzene (1,2,4-TCB) at 160° C. Quantification of SF and CF and determination of ethylene content (C2) are achieved by means of an infrared detector (IR4) and an online 2-capillary viscometer which is used for the determination of the intrinsic viscosity (IV).

The IR4 detector is a multiple wavelength detector detecting IR absorbance at two different bands (CH3 and CH2) for the determination of the concentration and the Ethylene content in Ethylene-Propylene copolymers. IR4 detector is calibrated with series of 8 EP copolymers with known Ethylene content in the range of 2 wt.-% to 69 wt.-% (determined by 13C-NMR) and various concentration between 2 and 13 mg/ml for each used EP copolymer used for calibration.

The amount of soluble fraction (SF) and crystalline fraction (CF) are correlated through the XS calibration to the "Xylene Cold Soluble" (XCS) fraction and "Xylene Cold Insoluble" (XCI) fraction, respectively, determined according to standard gravimetric method as per ISO16152. XS calibration is achieved by testing various ethylene propylene copolymers with XS content in the range 2-31 wt. %.

The intrinsic viscosity (IV) of the parent ethylene propylene copolymer and its soluble and crystalline fractions are determined with a use of an online 2-capillary viscometer and are correlated to corresponding intrinsic viscosities, determined by standard method in decalin according to ISO 1628/1 at 135° C. Calibration is achieved with various ethylene propylene and polypropylene copolymers with IV=2-4 dl/g.

A sample of the polypropylene composition to be analysed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

A defined volume of the sample solution is injected into the column filled with inert support where the crystallization of the sample and separation of the soluble fraction from the crystalline part is taking place. This process is repeated two times. During the first injection the whole sample is measured at high temperature, determining the IV [dl/g] and the C2 [wt. %] of the polypropylene composition. During the second injection the soluble fraction (at low temperature) and the crystalline fraction (at high temperature) with the crystallization cycle are measured (wt. % SF, wt. % C2, IV).

(iv) Stress Whitening

Stress whitening is determined by a modified three point bending test, namely the reversed three point bending test, (cf. FIG. 1).

The reversed three point bending test is carried out on a universal testing machine (Zwick Z010) at 50 mm/min. The samples are 2 mm thick injection moulded UL94 specimens (125×12.5×2 mm).

The experimental set-up consists of the reversed three point bending test coupled with an optical detection system.

The mechanical set up consists of:
- a fix part (1), with a span (2) of 40 mm, a moving part including a loading edge (3) with a light source (4) and an optical sensor (5) fixed on the moving part closely above and beneath the specimen (6) by a vertical rod. This ensures that the distance between light source and optical sensor remains constant during the test, which is a prerequisite for a good reproducibility of the measurements.

The force-deflection and the optical signal-deflection curves are recorded. At the beginning of the test, the optical signal (7) is calibrated to 100% (7a), regardless of the initial transparency/haziness of the inserted sample.

Occurrence of stress whitening is correlated with a sharp drop in the optical signal-deflection curve (cf. FIG. 2, reference 8 and further below).

Three different parameters are determined:
a) stress whitening angle,
b) residual size (width) of the blushing zones c) stress whitening intensity
a) The stress whitening angle [°], (also: bending angle or onset-angle) indicates, at which bending angle stress whitening (SW) occurs. The occurrence of stress whitening is correlated with a sharp drop of the optical response (light transmission) during bending (cf. FIG. 2).

Figure 2:
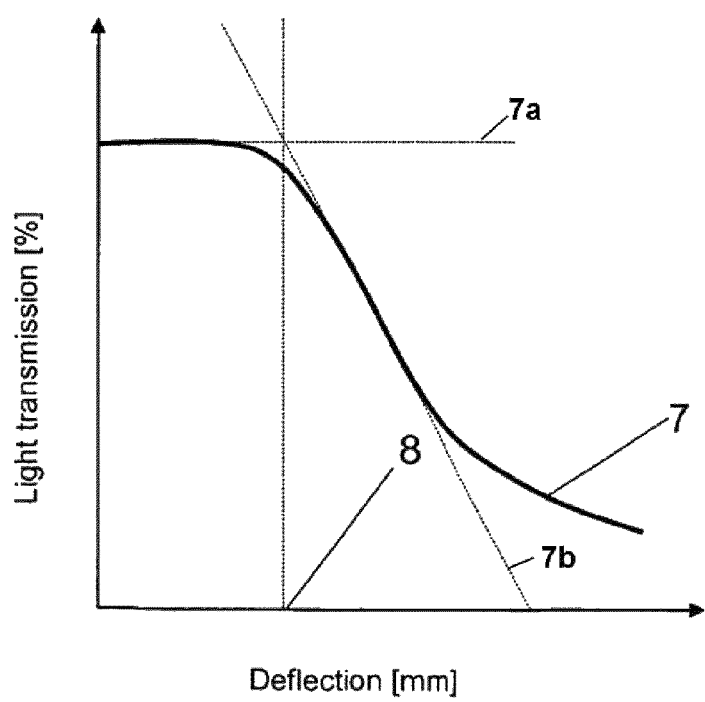
FIG. 2 illustrates a schematic diagram of the function recorded during a stress whitening experiment.

The onset angle for stress whitening is determined according to formula (VI):

$$\text{Onset angle} = (3*10^{-5}*s^4) - (2.1*10^{-3}*s^3) - (3.48*10^{-2}*s^2) + (6.4591*s) - 0.9997 \quad \text{(VI)}$$

wherein
"s" denominates the deflection of the loading edge, at which the light transmission curve drops and is determined as illustrated in FIG. 2:

At the beginning of the test, the optical signal (7) is calibrated to 100% (7a), regardless of the initial transparency/haziness of the inserted sample. The deflection of the loading edge (s), at which the in the light transmission curve drops is determined by the abscissa-value (8) of the intersection between the tangent of the slope of the optical signal (7b) and the 100% line of the initial optical signal (7a)

b) Residual size (width) of the blushing zones immediately after a bending of 90°, measured in [mm], also denominated as "Res-SW 90°" or "residual stress whitening";

The width of a blushing zone (b) is determined as follows:
Tests are conducted to a deflection corresponding to an angle of 90° according to the formula (VI) above. Then the specimen is abruptly unloaded with a crosshead speed of 400 mm/min. The width of the blushing area is measured immediately after testing using a slide gage.

c) Stress whitening intensity: this is the residual intensity of the blushing zone immediately after a bending of 90 deg. C. (visual appreciation from 0 to 5, with 0: no remaining blush, 5: intensive whitening), also denominated as "SW-intensity".

Evaluation of the Stress Whitening Intensity:
A mark of 0 is attributed when there is no residual blushing; a note of 5 when the whitening of the deformed zone is extremely pronounced. The obtained value is entered manually in a result sheet; average calculations are automated. The determination of these parameters is somewhat subjective and dependent on an operator. Although the obtained values are somewhat subjective they give essential information on the elastic recovery potential of the material.

The following degrees of intensity are noted:
a. an intensity of 0 is remarkably low (i.e. no blushing visible)
b. an intensity of up to 1 is excellent,
c. an intensity between 1.1 and 1.5 is good;
d. an intensity between 1.6 and 3 is acceptable;
e. an intensity higher than 3 is insufficient.

(v) Hexane Soluble Content ($C6_{FDA}$)

Hexane solubles (wt.-%): determined in accordance with FDA section 177.1520 1 g of a polymer cast film of 100 μm thickness (produced on a PM30 cast film line using chill-roll temperature of 40° C.) is extracted by 400 ml hexane at 50° C. for 2 hours while stirring with a reflux cooler. After 2 hours the mixture is immediately filtered on a filter paper N°41. The precipitate is collected in an aluminum recipient and the residual hexane is evaporated on a steam bath under nitrogen flow. The precipitate was weighted again and hexane solubles were calculated.

(vi) DSC Analysis, Melting Temperature (Tm)

These properties were measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature (Tc) and crystallization enthalpy (Hc) are determined from the cooling step, while melting temperature (Tm) and melting enthalpy (Hm) are determined from the second heating step, respectively, from the first heating step in case of the webs.

(vii) Charpy Notched Impact Strength (NIS)

The Charpy notched impact strength (NIS) was measured according to ISO 179 1 eA at +23° C., using injection molded bar test specimens of 80×10×4 mm³ prepared in accordance with EN ISO 1873-2.

(viii) Flexural Modulus

Flexural Modulus was determined in three-point bending according to ISO 178 using 80×10×4 mm³ test bars injection molded in line with EN ISO 1873-2.

(B) Material Description:
Catalyst 3.4 litre of 2-ethylhexanol and 810 ml of propylene glycol butyl monoether (in a molar ratio 4/1) were added to a 20 l reactor. Then 7.8 l of a 20% solution in toluene of BEM (butyl ethyl magnesium) provided by Crompton GmbH, were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to a storage vessel. 21.2 g of Mg alkoxide prepared above was mixed with 4.0 ml bis-(2-ethylhexyl) citraconate for 5 min. After mixing the obtained Mg complex was used immediately in the preparation of the catalyst component. 19.5 ml of titanium tetrachloride was placed in a 300 ml reactor equipped with a mechanical stirrer at 25° C. Mixing speed was adjusted to 170 rpm. 26.0 g of Mg-complex prepared above was added within 30 minutes keeping the temperature at 25° C. 3.0 ml of Viscoplex® 1-254 and 1.0 ml of a toluene solution with 2 mg Necadd 447™ was added. Then 24.0 ml of heptane was added to form an emulsion. Mixing was continued for 30 minutes at 25° C., after which the reactor temperature was raised to 90° C. within 30 minutes. The reaction mixture was stirred for a further 30 minutes at 90° C. Afterwards stirring was stopped and the reaction mixture was allowed to settle for 15 minutes at 90° C. The solid material was washed 5 times: Washings were made at 80° C. under stirring for 30 min with 170 rpm. After stirring was stopped the reaction mixture was allowed to settle for 20-30 minutes and followed by siphoning. Wash 1: Washing was made with a mixture of 100 ml of toluene and 1 ml donor Wash 2: Washing was made with a mixture of 30 ml of TiCl₄ and 1 ml of donor.

Wash 3: Washing was made with 100 ml of toluene. Wash 4: Washing was made with 60 ml of heptane. Wash 5: Washing was made with 60 ml of heptane under 10 minutes stirring. Afterwards stirring was stopped and the reaction mixture was allowed to settle for 10 minutes while decreasing the temperature to 70° C. with subsequent siphoning, followed by N₂ sparging for 20 minutes to yield an air sensitive powder. Ti content was 3.76 wt-% External Donor:

In the Examples, the external donor D (Dicyclopentyl dimethoxy silane CAS 126990-35-0) was used. The co-catalyst component used was triethyl aluminum (TEAL).

Polymerization

The polymerization conditions for Polymer 1 and Polymer 2 are listed in the Table below.

The materials used in the inventive examples are produced in a Borstar® pilot plant, equipped with a loop, a first gas phase reactor and a second gas phase reactor configuration. The loop and first gas phase reactor are used to produce the matrix and second gas phase reactor for rubber phase. The chemical composition of the reactants in each reactor were adjusted by man skilled in the art to reach the desired polymer design. The typical values are listed in Table 1 below.

TABLE 1

Polymerization details for polymers used for the inventive examples (IE's)

| | | Polymer 1 | Polymer 2 |
|---|---|---|---|
| Prepolymerizer | | | |
| Temperature | ° C. | 20 | 20 |
| Teal | g/t C3 | 170 | 170 |
| Donor | g/t C3 | 40 | 40 |
| Loop | | | |
| Feed H2/C3 | mol/kmol | 5.5 | 3.6 |
| Temperature | ° C. | 80 | 80 |
| Pressure | bar | 55 | 55 |
| Split | wt % | 50.4 | 50.7 |
| First gas phase reactor | | | |
| Temperature | ° C. | 85 | 85 |
| H2/C3 | mol/kmol | 23.7 | 14.1 |
| Pressure | bar | 21 | 21 |
| Split | wt % | 33.6 | 33.8 |

TABLE 1-continued

Polymerization details for polymers used for the inventive examples (IE's)

| | | Polymer 1 | Polymer 2 |
|---|---|---|---|
| Second gas phase reactor | | | |
| Temperature | ° C. | 70 | 70 |
| H2/C3 | mol/kmol | 230 | 210 |
| C2/C3 | mol/kmol | 450 | 450 |
| Split | wt % | 16 | 15.5 |

Examples IE1 and IE5 were stabilized with:
0.1 wt.-% of Irganox B225 (1:1-blend of Irganox 1010 and Irgafos 168) of BASF AG, Germany),
0.05 wt.-% calcium stearate.

IE2, IE3, and IE4 were compounded with HE9621-PH as modifier in the amounts indicated in Table 1.

HE9621-PH is a high density polyethylene with narrow molecular weight distribution. It has a density (according to ISO 1138) of 964 kg/m$^3$, a melt flow rate (190° C./2, 16 kg) according to ISO 1133 of 12 g/10 min and a flexural modulus (ISO 178) of 1.300 MPa.

The compounding was done using a ZSK 18 twin screw extruder. The melt temperature was 210° C., throughput was 7 kg/h.

For IE4 2 wt. % of a nucleating masterbatch were additionally added to introduce a polymeric nucleating agent. The nucleating masterbatch comprises a propylene homopolymer having MFR$_2$ of 2 g/10 min and 15 ppm of a polymeric nucleating agent and has a flexural modulus of 1700 MPa.

CE1 is BE170CF which is a heterophasic propylene copolymer having a MFR$_2$ of 13 g/10 min, commercially available from Borealis AG.

CE2 is BC545MO, which is a low-blush polypropylene heterophasic copolymer produced by Borealis AG. It has a MFR$_2$ of 3.5 g/10 min and a flexural modulus of 1200 MPa.

TABLE 2

Properties of IEs and CEs

| PP resin | | IE1 Polymer 1 | IE2 Polymer 1 | IE3 Polymer 1 | IE4 Polymer 1 | IE5 Polymer 2 | CE1 BE170CF | CE2 BC545MO |
|---|---|---|---|---|---|---|---|---|
| Modification | wt. % | none | 8% HE9621-PH | 15% HE9621-PH | 15% HE9621-PH & 2% nucl. MB | none | none | |
| MFR | g/10 min | 11 | 11 | 12 | 10 | 8 | 11 | 3.5 |
| NIS/23° C. | kJ/m$^2$ | 8.0 | 7.5 | 8.6 | 9.7 | 7.7 | 8.0 | 13.5 |
| Flex. Modulus | MPa | 1157 | 1201 | 1209 | 1325 | 1121 | 1040 | 1158 |
| C6 FDA | wt % | 1.4 | | | | | 2.1 | n.m. |
| Stress whitening intensity | n.a. | 3.0 | 2.0 | 1.0 | 1.6 | 3 | 5.0 | 4.0 |
| Residual Stress whitening | n.a. | 2.6 | 1.7 | 1.0 | 1.5 | 2.9 | 3.8 | 3.1 |
| Soluble Fraction (SF) | wt % | 14.9 | | | | 15.05 | 16.2 | n.m. |
| C2 | wt % | 8.6 | | | | 8.3 | 8.1 | |
| C2(SF) | wt % | 34.7 | | | | 36.3 | 39.1 | |
| C2(CF) | wt % | 3.8 | | | | 3.5 | 2.9 | |
| IV | dl/g | 1.9 | | | | 2.1 | 1.8 | |
| IV(SF) | dl/g | 2.3 | | | | 2.4 | 2.2 | |
| IV(CF) | dl/g | 1.7 | | | | 1.9 | 1.7 | |

The above result show that a heterophasic propylene copolymer composition as defined in the present invention shows improved optical properties, expressed by stress whitening intensity and stress whitening angle, but also improved mechanical properties, expressed by increased flexural modulus (FM) and notched Charpy impact strength (NIS). The composition further has low hexane soluble content which makes them highly attractive for food and medical applications.

The compositions of the present invention provide a synergistic effect primarily due to the better balance of stiffness (flexural modulus), impact (NIS) and stress whitening resistance.

The invention claimed is:

1. Heterophasic propylene copolymer composition, comprising
a heterophasic propylene copolymer (HECO) comprising a matrix (M) being a propylene homopolymer (H-PP) and an elastomeric propylene copolymer (EPC) dispersed in said matrix (M),
wherein the heterophasic propylene copolymer (HECO) has
a) a melt flow rate $MFR_2$ (2.16 kg, 230° C.) measured according to ISO 1133 in the range of 5.0 to 25.0 g/10 min,
(b) a soluble fraction content (SF) determined by TREF fractionation on CRYSTEX QC, Polymer Char (Valencia, Spain), in the range of 10.0 to 20.0 wt. %,
(c) an ethylene content of the soluble fraction content (SF) determined under (b) in the range of from 18 wt. % to less than 39 wt. %,
(d) an intrinsic viscosity (IV) determined according to DIN ISO 1628/1 (in decalin at 135° C.) of the soluble fraction (SF) in the range of from 1.5 to 2.3 dl/g,
(e) a crystalline fraction content (CF) determined by TREF fractionation on CRYSTEX QC, Polymer Char (Valencia, Spain), in the range of 80 to 90 wt. %,
(f) an ethylene content of the crystalline fraction content (CF) determined under (e) of from 0.1 wt. % to 5.0 wt. %,
(g) a flexural modulus of not less than 1050 MPa, determined in a 3-point-bending according to ISO 178 on injection molded specimens of 80×10×4 mm, prepared in accordance with EN ISO 1873-2, and
the heterophasic propylene copolymer composition has a total ethylene content in the range of from 7 wt. % to 30 wt. %, determined by quantitative NMR spectroscopy.

2. The heterophasic propylene copolymer composition according to claim 1, wherein the heterophasic propylene copolymer (HECO) has an intrinsic viscosity (IV) determined according to DIN ISO 1628/1 (in decalin at 135° C.) of the crystalline fraction (CF) in the range of from 1.0 to 3.0 dl/g.

3. The heterophasic propylene copolymer composition according to claim 1, which further comprises an ethylene copolymer (EC), and/or an alpha-nucleating agent (NU), preferably a polymeric alpha-nucleating agent.

4. The heterophasic propylene copolymer composition according to claim 3, wherein the ethylene copolymer (EC), preferably a high density polyethylene, is contained in an amount of from 3 to 20 wt. %.

5. The heterophasic propylene copolymer composition according to claim 1, wherein the heterophasic propylene copolymer (HECO) has a hexane soluble content, determined in accordance with FDA section 177.1520 of from 0 wt. % to lower than 2.0 wt. %.

6. The heterophasic propylene copolymer composition according to claim 1, wherein the heterophasic propylene copolymer (HECO) has a stress whitening intensity, determined as described in Section A (iv) herein, of not more than 3.5.

7. The heterophasic propylene copolymer composition according to claim 1, wherein the heterophasic propylene copolymer (HECO) has a Charpy notched impact strength (NIS), determined according to ISO 179 1 eA at −20° C. of at least 3.0 KJ/m$^2$, using injection molded bar test specimens of 80×10×4 mm, prepared in accordance with EN ISO 1873-2.

8. The heterophasic propylene copolymer composition according to claim 1, wherein the matrix (M) of the heterophasic propylene copolymer (HECO) is unimodal or multimodal.

9. The heterophasic propylene copolymer composition according to claim 8, wherein the matrix is bimodal and consists of two propylene homopolymer fractions (H-PP-1) and (H-PP-2).

10. Film comprising the heterophasic propylene copolymer composition according to claim 1.

11. A polymerization process for producing the heterophasic propylene copolymer composition according to claim 1 comprising polymerizing propylene in at least two subsequent polymerization steps in the presence of a Ziegler-Natta catalyst (ZN-C), whereby
a) polymerizing in the first polymerization reactor (R1) propylene, obtaining either a first propylene homopolymer fraction (H-PP-1) or the propylene homopolymer matrix (M), transferring said first propylene homopolymer fraction (H-PP-1) or propylene homopolymer matrix (M) to a second polymerization reactor (R2),
b) polymerizing in the second polymerization reactor (R2) either a second propylene homopolymer fraction (H-PP-2), forming together with the first propylene homopolymer fraction (H-PP-1) the propylene homopolymer matrix (M) or
polymerizing the elastomeric propylene copolymer fraction (EPC) in the presence of the propylene homopolymer matrix (M) produced in earlier steps, whereupon
c) if in the first and the second polymerization reactor the propylene homopolymer matrix (M) is produced, in an optional third polymerization reactor polymerizing the elastomeric propylene copolymer fraction (EPC) in the presence of the propylene homopolymer matrix (M) produced in earlier steps.

12. The polymerization process according to claim 11, wherein the heterophasic propylene copolymer composition is produced in the presence of
(a) a Ziegler-Natta catalyst (ZN-C) comprising an internal donor (ID),
(b) optionally a co-catalyst (Co), and
(c) optionally an external donor (ED).

13. The process according to claim 11, wherein the internal donor (ID) is selected from the group consisting of optionally substituted malonates, maleates, succinates, glutarates, cyclohexene-1,2-dicarboxylates, benzoates and derivatives and/or mixtures thereof, preferably from citraconates.

* * * * *